United States Patent [19] [11] Patent Number: 4,529,747
Kato et al. [45] Date of Patent: Jul. 16, 1985

[54] SOFT CONTACT LENSES

[75] Inventors: Yasuyuki Kato; Kentaro Kasuga; Yoshitaka Taniyama; Masuji Ichihara; Tamio Suzuki, all of Nagoya, Japan

[73] Assignee: Toyo Contact Lens Co., Ltd., Nagoya, Japan

[21] Appl. No.: 573,376

[22] Filed: Jan. 24, 1984

[30] Foreign Application Priority Data

Apr. 22, 1983 [JP] Japan ................... 58-70101

[51] Int. Cl.³ ............... C08L 39/06; C08L 33/26; C08L 33/14
[52] U.S. Cl. ................... 523/108; 523/106; 524/548; 524/555; 524/558; 351/160 H
[58] Field of Search ........... 523/106, 108; 524/548, 524/555, 558

[56] References Cited

U.S. PATENT DOCUMENTS 3,926,892 12/1975 Holcombe ................ 523/106
3,947,401 3/1976 Stamberger ............. 523/106
3,988,274 10/1976 Masuhara .............. 523/106
4,123,408 10/1978 Gordon ................ 523/108
4,130,706 12/1978 Plambeck ............. 523/106
4,436,887 3/1984 Chromecek ........... 523/108

FOREIGN PATENT DOCUMENTS 1478455 6/1977 United Kingdom ........... 523/106

Primary Examiner—C. Warren Ivy
Attorney, Agent, or Firm—Oblon, Fisher, Spivak, McClelland & Maier

[57] ABSTRACT

A soft contact lens made of a copolymer composed essentially of:

(a) from about 30 to about 60 parts by weight of at least one monomer selected from the group consisting of long chain alkyl acrylates and methacrylates represented by the general formula:

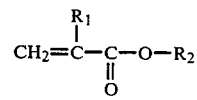

where $R_1$ is a hydrogen atom or a methyl group, and $R_2$ is a straight chained or branched alkyl group having from 5 to 18 carbon atoms;

(b) from about 40 to about 70 parts by weight of at least one hydrophilic monomer selected from the group consisting of dimethylacrylamide, N-vinylpyrrolidone, a hydroxyalkyl acrylate and a hydroxyalkyl methacrylate; and (c) from about 0.05 to about 2.0 parts by weight of a cross-linking agent; and having a water content of from about 25 to about 50% by weight.

6 Claims, No Drawings

SOFT CONTACT LENSES

The present invention relates to a soft contact lens made of a novel copolymer.

Contact lenses are generally classified in two types, i.e. (1) hard contact lenses made of a hard polymer such as poly(methylmethacrylate) and (2) soft contact lenses made of a water-nonabsorptive soft polymer such as silicone rubber or a water-absorptive hard polymer such as poly(2-hydroxyethyl methacrylate) or poly(N-vinyl-pyrrolidone). The hard contact lenses have poor oxygen permeability, and when put on cornea for a long period of time, they are likely to lead to blood shot eyes or a metabolic trouble of the corneal tissues. Whereas, the water-absorptive soft contact lenses have merits in that when put on cornea, they give a better feeling to the wearer and better compatibility to the eyes than the hard contact lenses. However, contact lenses made of a polymer composed essentially of 2-hydroxyethyl methacrylate, are incapable of supplying an adequate amount of oxygen to the corneal tissues and thus have a drawback that they can not be worn continuously for a long period of time. Whereas, contact lenses made of a polymer composed essentially of N-vinylpyrrolidone, have a high water content and thus have good oxygen permeability, whereby an adequate amount of oxygen can be supplied to the corneal tissues. However, the water content is so high that they have drawbacks such that the strength of the material tends to be poor and the dimensional stability of the lenses is poor as the water in the lenses tends to evaporate when they are worn.

On the other hand, contact lenses made of silicone rubber have high oxygen permeability. However, the lens surfaces have strong water repellency. In order to reduce the water repellency, it is common to apply corona discharge treatment to give a hydrophilic nature to the surfaces, and yet it is difficult to adequately eliminate the water repellency. Accordingly, such lens surfaces are likely to be stained, whereby the lenses tend to have white turbidity, or they tend to give an uncomfortable feeling or a pain to the wearer or give a damage to the corneal tissues.

Under the circumstances, it is an object of the present invention to provide a soft contact lens having a relatively low water content and good oxygen permeability, and yet having high dimensional stability.

Namely, the present invention provides a soft contact lens made of a copolymer composed essentially of:

(a) from about 30 to about 60 parts by weight of at least one monomer selected from the group consisting of long chain alkyl acrylates and methacrylates represented by the general formula:

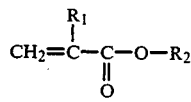

where $R_1$ is a hydrogen atom or a methyl group, and $R_2$ is a straight chained or branched alkyl group having from 5 to 18 carbon atoms;

(b) from about 40 to about 70 parts by weight of at least one hydrophilic monomer selected from the group consisting of dimethylacrylamide, N-vinylpyrrolidone, a hydroxyalkyl acrylate and a hydroxyalkyl methacrylate; and (c) from about 0.05 to about 2.0 parts by weight of a cross-linking agent; and having a water content of from about 25 to about 50% by weight.

Now, the present invention will be described in detail with reference to the preferred embodiments.

As compared with poly(methylmethacrylate) commonly used for conventional hard-type contact lenses, the polymers of the long chain alkyl acrylates or methacrylates of the general formula I according to the present invention, have very high oxygen permeability. By using from about 30 to about 60 parts by weight of the long chain alkyl acrylate or methacrylate having such a property, it has been made possible to obtain a copolymer having a relatively low water content at a level of from about 25 to about 50% by weight and yet having high oxygen permeability substantially equal to the oxygen permeability of the above-mentioned high water content material in which the oxygen permeability used to be improved by increasing the water content at the sacrifice of the strength or the dimensional stability of the material.

As the long chain alkyl acrylate or methacrylate of the general formula I, there may be mentioned a long chain alkyl acrylate such as pentyl acrylate, hexyl acrylate, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate or octadecyl acrylate, and a long chain alkyl methacrylate such as pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacrylate, heptadecyl methacrylate or octadecyl methacrylate. These monomers may be used alone or in combination of two or more different kinds.

In the general formula I, $R_2$ is a straight chained or branched alkyl group having from 5 to 18 carbon atoms. If the number of the carbon atoms of the alkyl group as $R_2$ is less than the above range, the oxygen permeability tends to decrease accordingly. On the other hand, if the number of the carbon atoms of the alkyl group as $R_2$ is greater than the above range, the elasticity of the copolymer will be lost, whereby the copolymer will be unsuitable as the material for the soft contact lenses of the present invention.

For the above reasons, according to the present invention, it is desirable to employ a long chain alkyl acrylate or methacrylate having an alkyl group having from 5 to 18 carbon atoms, preferably from 7 to 14 carbon atoms.

The long chain alkyl acrylate or methacrylate is used in an amount of from about 30 to about 60 parts by weight per 100 parts by weight of the total monomer mixture, whereby a contact lens having adequate oxygen permeability and strength will be obtained.

If the amount is less than about 30 parts by weight, no adequate effectiveness for the improvement of the oxygen permeability will be obtained, and in order to obtain high oxygen permeability, it will be required to increase the water content at the sacrifice of the strength of the material. On the other hand, if the amount is greater than about 60 parts by weight, it will be difficult to obtain the desired water content.

As the hydrophilic monomer used to impart water absorptivity and hydrophilic nature to the copolymer, there may be mentioned a hydrophilic monomer such as dimethyl acrylamide, N-vinylpyrrolidone, a hydroxyalkyl acrylate or a hydroxyalkyl methacrylate.

As the hydroxyalkyl acrylate or methacrylate, there may be mentioned 2-hydroxyethyl acrylate, 2-hydroxypropyl acrylate, 2-hydroxybutyl acrylate, 2-hydroxyethyl methacrylate, 2-hydroxypropyl methacrylate or 2-hydroxybutyl methacrylate.

These hydrophilic monomers may be used alone or in combination of two or more different kinds.

The hydrophilic monomer is used in an amount of from about 40 to about 70 parts by weight per 100 parts by weight of the total monomer mixture.

The hydrophilic monomer is appropriately selected within the above-mentioned range for use in combination with the long chain alkyl acrylate or methacrylate. It is particularly preferred to employ a combination of N-vinylpyrrolidone and a hydroxyalkyl methacrylate, because it is thereby possible to obtain a copolymer having a satisfactory optical property, superior oxygen permeability and a desired water content and thus being suitable for soft contact lenses. In this case, the weight ratio of N-vinylpyrrolidone to the hdyroxyalkyl methacrylate is preferably within a range of about 90/10 to about 50/50.

It is preferred to employ a cross-linking agent to increase the solvent resistance and dimensional stability of the copolymer obtainable according to the present invention.

As such a cross-linking agent, there may be mentioned ethylene glycol dimethacrylate, diethylene glycol dimethacrylate, triethylene glycol dimethacrylate, allyl methacrylate, trimethylolpropane trimethacrylate, divinyl benzene or diallyl phthalate. These cross-linking agents may be used alone or in combination of two or more different kinds. The cross-linking agent is used preferably in an amount within a range of from about 0.05 to about 2.0 parts by weight per 100 parts by weight of the total monomer mixture.

For the preparation of the copolymer of the present invention, it is usual to employ a radical polymerization initiator which is commonly employed for the polymerization of an unsaturated hydrocarbon compound.

As such a radical polymerization initiator, there may be mentioned, for instance, benzoylperoxide, azobisisobutyronitrile or azobisdimethylvaleronitrile. These radical polymerization initiators may be used alone or in combination as a mixture of two or more different kinds. The polymerization initiator is used preferably in an amount within a range of from about 0.05 to about 1 part by weight per 100 parts by weight of the monomer mixture to be copolymerized.

The polymerization and the shaping into contact lenses may be conducted in accordance with the conventional polymerization and shaping techniques. For instance, the polymerization can be conducted in a mold designed for the convenience of the subsequent fabrication into contact lenses, and the molded product is then cut into the form of contact lenses. Alternatively, it is also possible to conduct the polymerization and molding in a mold with a convex die and a concave die designed to directly form a contact lens.

Further, the soft contact lenses thus prepared, may be subjected to the following treatments for imparting a hydrophilic nature to improve the long term stability of the hydrophilic nature of the contact lenses:

(1) plasma discharge treatment, or graft polymerization treatment of a hydrophilic monomer by plasma discharge;
(2) graft polymerization treatment of a hydrophilic monomer by radiation of ultra-violet rays;
(3) dipping treatment in a strong acid such as hydrochloric acid or nitric acid.

The feature of the soft contact lens of the present invention may be summarized as follows.

The long chain alkyl acrylate or methacrylate is used in an effective amount, whereby it is possible to obtain a soft contact lens having adequate oxygen permeability and a relatively low water content without unnecessarily increasing the water content at the sacrifice of the strength or the dimensional stability of the contact lens.

Now, the present invention will be described in further detail with reference to Examples and Comparative Examples. However, it should be understood that the present invention is by no means restricted by these specific Examples.

EXAMPLE 1

45 parts by weight of n-dodecyl methacrylate, 45 parts by weight of N-vinyl-2-pyrrolidone, 10 parts by weight of 2-hydroxyethyl methacrylate, 0.4 part by weight of allyl methacrylate and 0.2 part by weight of azobisisobutyronitrile were mixed, and the liquid mixture thereby obtained, was poured into a mold. (The mold is usually made of polyethylene or polypropylene and designed to form a molded polymer having a predetermined shape such as a rod-shape or plate-shape which is readily fabricated into contact lenses.) The mold used in this Example, was a tubular mold made of polypropylene and having an inner diameter of 16 mm and a depth of 180 mm. After pouring the liquid mixture into the mold, the mold was sealed with a cover, and subjected to the polymerization reaction by heating it under the following heating condition.

Namely, the mold containing the liquid mixture was immersed in a water bath and held at a water bath temperature of 40° C. for 16 hours and at 50° C. for 8 hours. Then, the mold was taken out from the water bath, transferred into a drier and held at 50° C. for 4 hours, at 60° C. for 4 hours, at 70° C. for 4 hours, at 80° C. for 3 hours, at 90° C. for 3 hours, at 100° C. for 3 hours and at 110° C. for 3 hours. Then, the mold was cooled to room temperature, and the molded product was taken out from the mold.

The rod-shaped polymer thus obtained was colorless, transparent and water absorptive, and upon absorption of water, it had a flexibility and high physical strength. The physical properties of this polymer are shown in Table 1.

Then, by using this polymer as the base material for contact lenses, the polymer was cut into discs having a thickness of 5 mm by a known machining technique. The discs were further processed by grinding and polishing operation into a shape of contact lenses and then immersed in a physiological sodium chloride solution to permit them to fully swell upon absorption of water, whereby soft contact lenses were obtained.

COMPARATIVE EXAMPLE 1

(A Comparative Example in which methyl methacrylate was used instead of the long chain alkyl methacrylate)

A polymer was prepared in the same manner as in Example 1 except that 45 parts by weight of methyl methacrylate was used instead of 45 parts by weight of n-dodecyl methacrylate in Example 1, and the polymer was processed into contact lenses in the same manner as in Example 1. The physical properties of the contact lenses thus obtained, are shown in Table 1 as Comparative Example 1.

COMPARATIVE EXAMPLE 2

(A Comparative Example in which the oxygen permeability substantially equal to that in Example 1 was obtained by increasing the water content without using the long chain alkyl methacrylate)

Contact lenses were prepared in the same manner as in Example 1 except that 15 parts by weight of methyl methacrylate, 75 parts by weight of N-vinyl-2-pyrrolidone, 10 parts by weight of 2-hydroxyethyl methacrylate, 0.4 part by weight of allyl methacrylate and 0.2 part by weight of azobisisobutylonitrile were used. The physical properties of the contact lenses thus obtained, are shown in Table 1 as Comparative Example 2.

TABLE 1

| Physical properties | Example 1 | Comparative Example 1 | Comparative Example 2 |
|---|---|---|---|
| Water content (% by weight) | 44.8 | 45.2 | 70 |
| Needle penetration strength (g) | 365 | 820 | 50 |
| Oxygen permeability coefficient $\times 10^{10}$ (ml $O_2$ cm$^2$/cm$^3 \cdot$ sec $\cdot$ mmHg) | 3.0 | 1.2 | 3.0 |
| Outer appearance | Colorless transparent | Slightly turbid with white | Colorless transparent |

Test pieces having a diameter of 10 mm and a thickness of 0.2 mm were immersed in a 0.9% physiological sodium chloride solution and boiled to let the pieces sufficiently absorb water and swell to the equilibrium swollen state. By using the pretreated test pieces, the physical properties were measured.

Water content:

The above-mentioned test piece was adequately dried, then immersed in a 0.9% physiological sodium chloride solution and held therein until the water absorption reached the equilibrium state. The weight (W) of the adequately water-absorbed test piece was measured. Then, the water-absorbed test piece was dried in a drier until it reached a constant level of weight, and the weight (w) of the test piece at the constant weight level was measured. The water content was calculated in accordance with the following equation.

$$\text{Water content (\%)} = \frac{W - w}{W} \times 100$$

Needle penetration strength:

The test piece was placed on a cylindrical stand of a needle penetration strength tester and secured along its periphery to on the stand. Then, a needle having a diameter of 1/16 inch and a round tip was positioned at the center of the test piece, and a load was exerted on the other end of the needle to press the test piece with the round tip. The weight value (g) of the load at the time when the test piece was elongated and finally broken, was taken as the value of the needle penetration strength.

Oxygen permeability coefficient:

The oxygen permeability coefficient was measured by Seikaken-type film oxygen permeability tester (manufactured by Rika Seiki Kogyo K.K.).

As shown in Table 1, the contact lenses obtained in Example 1 had a saturated water content of 44.8% by weight and an oxygen permeability coefficient of $3.0 \times 10^{-10}$ ml$O_2$.cm$^2$/cm$^3$.sec.mmHg. Whereas the contact lenses obtained in Comparative Example 1, had a saturated water content of 45.2% by weight, which is substantially equal to the water content of the contact lenses obtained in Example 1, but their oxygen permeability coefficient was as low as $1.2 \times 10^{-10}$ ml$O_2$.cm$^2$/cm$^3$.sec.mmHg and their elasticity was poor. In order to obtain an oxygen permeability coefficient of $3.0 \times 10^{-10}$ ml$O_2$.cm$^2$/cm$^3$.sec.mmHg by using the conventional high-water content material, it is necessary to increase the saturated water content to a level of 70% by weight as shown by Comparative Example 2, whereby the needle penetration strength of the material upon absorption of water will be substantially lowered (to a level of 50 g as shown by Comparative Example 2, as compared with 365 g attained in Example 1), and such a material is not satisfactory as the material for contact lenses.

EXAMPLES 2 to 14

Various polymers were prepared in the same manner as in Example 1 by using the long chain alkyl methacrylates, the hydrophilic monomers and the cross-linking agents in the proportions as identified in Table 2.

The polymers thus obtained were all colorless, transparent and water absorptive.

The polymers were subjected to the same cutting and polishing treatments as in Example 1 to obtain soft contact lenses. The physical properties of the polymers are also shown in Table 2.

TABLE 2

| | Examples | | | | | | | | | | | | |
|---|---|---|---|---|---|---|---|---|---|---|---|---|---|
| | 2 | 3 | 4 | 5 | 6 | 7 | 8 | 9 | 10 | 11 | 12 | 13 | 14 |
| Components: | | | | | | | | | | | | | |
| n-pentyl MA (parts by weight) | 45 | | | | | | | | | | | | 52 |
| n-octyl MA | | 50 | | | | | | | | | | | |
| 2-ethylhexyl MA | | | 45 | | | | | | | | | 52 | |
| n-nonyl MA | | | | 50 | | | | | | | | | |
| n-decyl MA | | | | | 35 | 35 | | | | | | | |
| 3,7-dimethyloctyl MA | | | | | | | 45 | | | | | | |
| n-dodecyl MA | | | | | | | | 35 | 35 | | | | |
| n-octadecyl MA | | | | | | | | | | 45 | 45 | | |
| Dimethylamide | | | | | | | | | | | | 48 | 48 |
| N—vinylpyrrolidone | 45 | 30 | 45 | 40 | 45 | 35 | 45 | 45 | 35 | 30 | 45 | | |
| 2-hydroxyethyl MA | 10 | 20 | 10 | 10 | 20 | 30 | 10 | 20 | 30 | 25 | 10 | | |
| Ethylene glycol diMA | | | | | | | | | | | | 0.25 | |
| TMP | | | | | | | | | | | | | 1.0 |

TABLE 2-continued

| | Examples | | | | | | | | | | | | |
|---|---|---|---|---|---|---|---|---|---|---|---|---|---|
| | 2 | 3 | 4 | 5 | 6 | 7 | 8 | 9 | 10 | 11 | 12 | 13 | 14 |
| Allyl MA | 0.4 | 0.4 | 0.4 | 0.4 | 0.4 | 0.4 | 0.4 | 0.4 | 0.4 | 0.4 | 0.4 | | |
| V-65 | | | | | | | | | | | | 0.05 | 0.05 |
| A.I.B.N. | 0.2 | 0.2 | 0.15 | 0.2 | 0.2 | 0.2 | 0.2 | 0.2 | 0.2 | 0.2 | 0.2 | | |
| Physical properties: | | | | | | | | | | | | | |
| Water content (% by weight) | 43.3 | 31.2 | 45.5 | 41.4 | 46.1 | 31.4 | 43.0 | 46.8 | 41.0 | 39.1 | 49.2 | 38.2 | 37.0 |
| Oxygen permeability coefficient $\times 10^{10}$ (ml $O_2 \cdot cm^2/cm^3 \cdot sec \cdot mmHg$) | 2.2 | 1.8 | 1.8 | 2.6 | 2.4 | 1.6 | 2.2 | 2.4 | 2.4 | 1.7 | 1.7 | 1.9 | 2.2 |

Note: MA: methacrylate, TMP: trimethylolpropane trimethacrylate, V-65: azobisdimethylvaleronitrile, A.I.B.N.: azobisisobutyronitrile

EXAMPLE 15

50 parts by weight of n-dodecylarcrylate, 45 parts by weight of N-vinylpyrrolidone, 5 parts by weight of 2-hydroxyethyl methacrylate, 0.4 part by weight of allyl methacrylate and 0.3 part by weight of azobisisobutyronitrile were mixed. Then, the mixture was slowly poured into a concave mold die, a convex die was placed on the concave die, and the concave and convex dies were clamped while paying due attention not to permit air bubbles to form. The mold comprising the concave and convex dies used here, was made of polypropylene and designed to have an inner configuration corresponding to a predetermined shape of a contact lens.

The clamped mold dies were heated in a hot air circulating drier at 50° C. for 3 hours, and then the temperature was gradually raised at a rate of 10° C./3 hr, whereby the polymerization was conducted for 18 hours. Then, the mold dies were cooled to room temperature, and the clamp was removed.

The mold comprising the concave and convex dies was immersed in a distilled water and boiled to separate the concave die from the convex die. The boiling was continued for 1 hour, and then the molded contact lens was taken out and immersed in a 0.9% physiological sodium chloride solution to permit it to fully swell upon absorption of water, whereby a soft contact lens was obtained.

The swollen soft contact lens was colorless and transparent, and it had good dimensional stability and sufficient force of restitution. The wettability of the lens surface was also good.

The physical properties of the contact lens were measured in the same manner as in Example 1, whereby it was found that the water content was 36.5% by weight and the oxygen permeability coefficient was $3.8 \times 10^{-10}$ ml$O_2$.cm/cm$^3$.sec/mmHg.

In all Examples, the water content and the oxygen permeability were adequate for soft contact lenses.

We claim:

1. A soft contact lens made of a copolymer consisting essentially of:
   (a) from about 30 to about 60 parts by weight of the total momoner mixture of at least one momoner selected from the group consisting of long chain alkyl acrylates and methacrylates represented by the general formula:

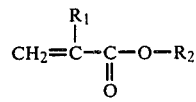

where $R_1$ is a hydrogen atom or a methyl group, and $R_2$ is a straight chained or branched alkyl group having from 5 to 18 carbon atoms;
   (b) from about 40 to about 70 parts by weight of the total monomer mixture of at least one hydrophilic monomer selected from the group consisting of dimethylacrylamide, N-vinylpyrrolidone, a hydroxyalkyl acrylate and a hydroxyalkyl methacrylate; and
   (c) from about 0.05 to about 2.0 parts by weight of the total monomer mixture of a cross-linking agent selected from the group consisting of ethylene glycol dimethacrylate, diethylene glycol dimethacrylate, triethylene glycol dimethacrylate, allyl methacrylate, trimethylolpropane trimethacrylate, divinyl benzene and diallylphthalate; wherein the said copolymer has a water content of from 25 to 50% by weight.

2. The soft contact lens according to claim 1, wherein $R_2$ in the general formula I is an alkyl group having from 7 to 14 carbon atoms.

3. The soft contact lens according to claim 1, wherein the long chain alkyl acrylates are pentyl acrylate, hexyl acrylates, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate and octadecyl acrylate, and the long chain alkyl methacrylates are pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacrylate, heptadecyl methacrylate and octadecyl methacrylate.

4. The soft contact lens according to claim 1, wherein the hydroxyalkyl acrylate is 2-hydroxyethyl acrylate, 2-hydroxypropyl acrylate or 2-hydroxybutyl acrylate, and the hydroxyalkyl methacrylate is 2-hydroxyethyl methacrylate, 2-hydroxypropyl methacrylate or 2-hydroxybutyl methacrylate.

5. The soft contact lens according to claim 1, wherein said at least one hydrophilic monomer is a combination of N-vinylpyrrolidone and a hydroxyalkyl methacrylate.

6. The soft contact lens according to claim 5, wherein the weight ratio of N-vinylpyrrolidone to the hydroxyalkyl methacrylate is from about 90/10 to about 50/50.

* * * * *